J. R. ANDERSON.
VARIABLE SPEED TRANSMISSION DEVICE.
APPLICATION FILED AUG. 2, 1907.
910,983.
Patented Jan. 26, 1909.
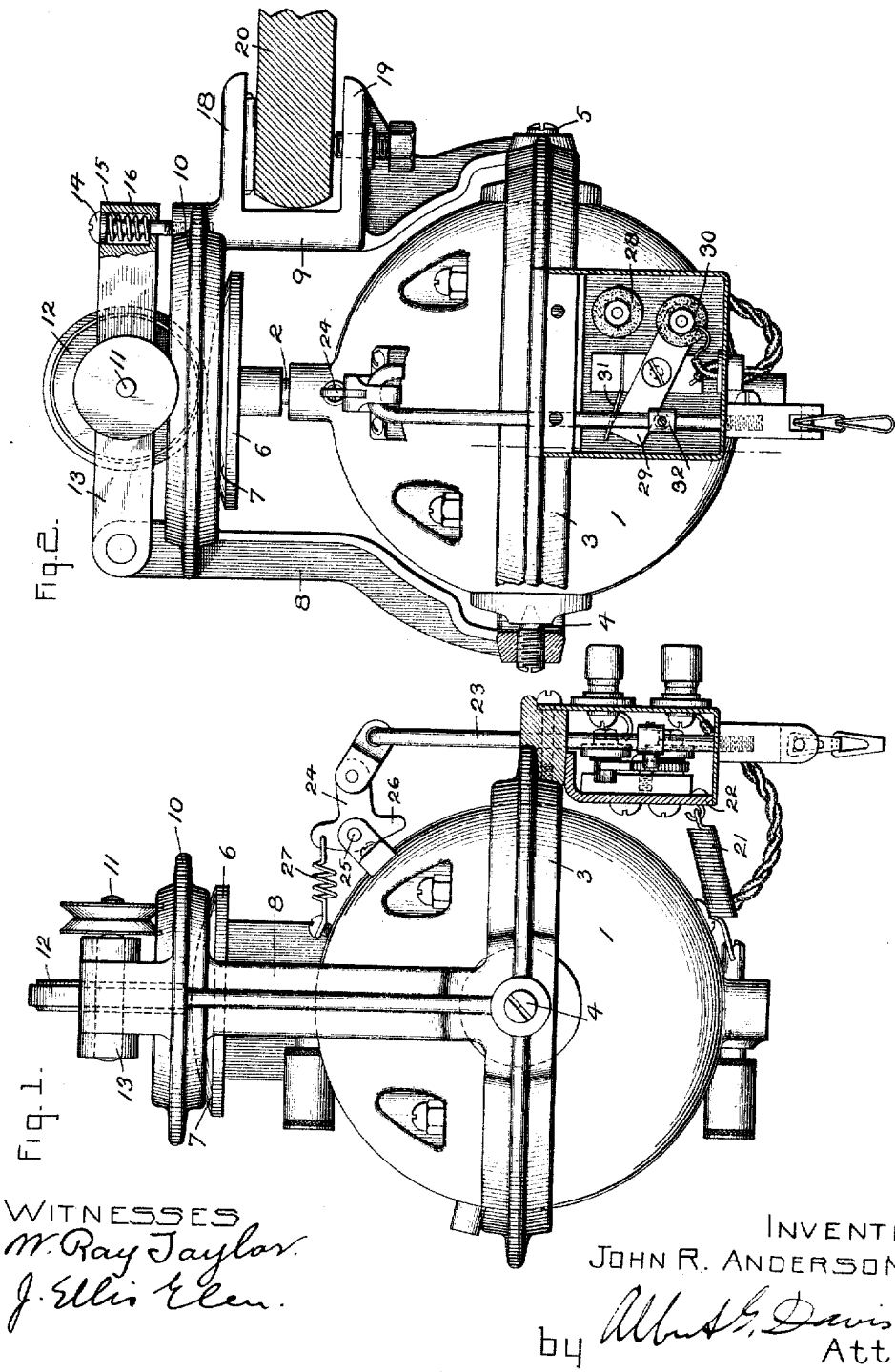
WITNESSES
W. Ray Taylor.
J. Ellis Glen.
INVENTOR
JOHN R. ANDERSON.
by Albert G. Davis
Atty

UNITED STATES PATENT OFFICE.

JOHN R. ANDERSON, OF PITTSFIELD, MASSACHUSETTS, ASSIGNOR, BY MESNE ASSIGNMENTS, TO GENERAL ELECTRIC COMPANY, A CORPORATION OF NEW YORK.

VARIABLE-SPEED TRANSMISSION DEVICE.

No. 910,983.　　　Specification of Letters Patent.　　　Patented Jan. 26, 1909.

Application filed August 2, 1907. Serial No. 386,750.

*To all whom it may concern:*

Be it known that I, JOHN R. ANDERSON, a citizen of the United States, residing at Pittsfield, in the county of Berkshire, State of Massachusetts, have invented certain new and useful Improvements in Variable-Speed Transmission Devices, of which the following is a specification.

My invention relates to power transmission devices of the kind wherein a small electric motor operating at a constant speed is employed to drive machines, such as sewing machines, for example, at variable speeds; and it has for its object to simplify and improve the construction of such devices.

The various features of novelty characterizing my invention will be hereinafter pointed out with particularity in the claims, but for a full understanding of the invention and of its objects and advantages reference may be had to the following detailed description taken in connection with the accompanying drawing, wherein:

Figure 1 is an end view of a motor and its auxiliary power transmitting means arranged in accordance with a preferred form of my invention, the casing containing the controlling switch being shown in cross-section; and Fig. 2 is a view taken at right angles to Fig. 1, portions being broken away to more clearly disclose the working parts.

Reference being had to the drawing, 1 indicates a motor which is illustrated as being of the ordinary spherical type commonly used as fan motors or for driving small machines or tools. Surrounding the motor casing, in a plane at right angles to the motor shaft 2 and substantially midway between the motor bearings, is a ring-like bracket 3. The motor is supported by trunnions 4 and 5 on the bracket, so as to be capable of oscillation about an axis at right angles to the axis of the armature and shaft. Upon the end of the motor shaft is arranged a disk-like driving pulley 6 having its driving face 7 curved to conform with the surface of a sphere whose center is at the point of intersection between the two axes about which the driving pulley is adapted to be moved. Extending from the bracket 3 toward and slightly beyond the driving pulley are two arms 8 and 9 which are connected together near their outer ends by a second and smaller ring-like bracket 10 arranged parallel with the bracket 3 and forming a guard about the driving pulley.

11 is a countershaft having its axis arranged in the plane of movement of the axis of the motor, and this countershaft carries a driven pulley 12 which engages with the driving pulley. The countershaft may conveniently be supported by a frame 13 which is pivoted at one end on the end of arm 8 which is extended for this purpose. The other end of the member 13 is yieldingly secured to the arm 9 in any suitable manner. This may conveniently be done by passing a screw or bolt 14 through the end of the member 13 and into the end of the arm 9 and placing between the screw or bolt and the said member a spring 15 located in a socket 16 provided for that purpose.

When the motor occupies its normal position, namely, that wherein the motor shaft is at right angles to the plane of the bracket 3, the point of engagement between the two pulleys is at the center of the driving pulley, namely directly on the axis of the motor shaft and, although this shaft may be rotating no movement of the driven pulley results. Upon swinging the motor bodily on its pivotal supports, the point of contact between the two pulleys is moved away from the center of the driving pulley so that, when the motor is set in operation, the driven pulley is rotated at a speed depending upon the angle through which the motor has been oscillated. In this way, although the motor shaft may run at a constant speed, the driven pulley and countershaft are driven at a variable speed; and, by providing a driving connection between the countershaft and a machine to be driven, the machine may be operated at a variable speed.

It will be seen that the yielding connections between the support for the driving pulley and the bracket affords further means for varying the speed, namely through adjustment of the friction between the two pulleys. The principal function of the yielding pressure between the pulleys, is, however, to maintain a good driving engagement between the same even after considerable wear has taken place. By removing the screw or bolt 14, it becomes possible to swing the member 13 about its pivot and carry the driven pulley out of engagement with the driving pulley.

I have shown a pair of jaws 18 and 19 projecting laterally from the arm 9 whereby the device may be clamped to the table or other part 20 of the machine which is to be driven by the motor. Any other suitable supporting means may, however, be employed.

The angular position of the motor may be controlled in any suitable way as, for example, a spring 21 arranged between the motor casing and a projection 22 on the bracket may serve to hold the motor normally in the position wherein the center of the driving pulley engages with the driven pulley, and the motor may be rotated out of this normal position by means of a rod 23 which is connected to the motor casing. I prefer to provide a slight lost motion between the rod 23 and the motor casing for the purpose of permitting the motor circuit to be closed before the motor begins to move when the rod is operated. To this end the upper end of the rod may conveniently be connected to one arm of a bell crank lever 24 which is pivotally supported on the motor casing at 25. The other arm 26, of this bell crank lever, is normally held out of engagement with the motor casing by means of a spring 27; but when the rod is pulled downward, the tension of the spring 27 is gradually overcome until the arm 26 of the bell crank lever abuts against the motor casing, whereupon further movement of the rod compels the motor to swing on its trunnions. This initial lost motion may be utilized for closing the motor circuit in any suitable manner. Thus, for example, I may provide a switch having a fixed contact 28 and a movable arm 29 carrying a second contact 30 which, when it engages the fixed contact, closes the motor circuit. The contacts are normally held in engagement by means of a spring 31, but, when the parts are in their normal positions and the rod is drawn upwards by means of the springs 27 and 21, a collar 32 on the rod engages with the arm of the switch and moves it so as to carry the movable contact out of engagement with the fixed contact, thus opening the motor circuit. During the initial downward movement of the rod before the motor begins to swing, the collar on the rod releases the switch arm and permits the contacts to come into engagement with each other. By this arrangement the motor is permitted to start on no load.

What I claim as new and desire to secure by Letters Patent of the United States, is,—

1. In combination, a bracket, a motor mounted in said bracket for oscillation about an axis at right angles to the motor shaft, a friction pulley on said shaft having a driving face curved to conform to a sphere whose center is at the point of intersection of the axis of the motor shaft and the axis about which the motor oscillates, a countershaft mounted in said bracket, a driven pulley carried by said countershaft and engaging with the driving pulley, and means for conjointly oscillating said motor and closing the motor circuit comprising a reciprocating rod yieldingly connected to said motor and a switch having its movable member in operative engagement with said rod.

2. In combination, a bracket, a motor mounted in said bracket for oscillating about an axis at right angles to the motor shaft, a friction pulley on said shaft having a driving face curved to conform to a sphere whose center is at the intersection of the axis of the motor shaft and the axis about which the motor oscillates, a countershaft mounted in said bracket, a driven pulley on said countershaft, and means for conjointly oscillating said motor and closing the motor circuit comprising a reciprocating rod yieldingly connected to said motor and a switch having its movable member in operative engagement with said rod.

3. In combination, a bracket, a motor mounted in said bracket for oscillating about an axis at right angles to the motor shaft, a friction pulley on said shaft having a driving face curved to conform to a sphere whose center is at the intersection of the axis of the motor shaft and the axis about which the motor oscillates, a member hinged to said bracket, and a driven pulley mounted on said member and thereby held in engagement with the driving pulley.

4. In combination, a bracket, a motor mounted in said bracket for oscillating about an axis at right angles to the motor shaft, a friction pulley on said shaft having a driving face curved to conform to a sphere whose center is at the intersection of the axis of the motor shaft and the axis about which the motor oscillates, an arm hinged at one end to said bracket and yieldingly connected to the bracket at the other end, and a driven pulley carried by said arm and thereby held in engagement with the driving pulley.

5. In combination, a bracket, a motor mounted therein for oscillating about an axis at right angles to the motor shaft, a friction pulley on said shaft having its driving face curved to conform to the surface of a sphere whose center is at the point of intersection of the axis about which the motor oscillates and the axis of the motor shaft, a driven pulley mounted in said bracket for rotation about an axis lying in the plane in which the motor shaft swings, means for holding said pulleys in engagement with each other, and means for conjointly oscillating said motor and closing the motor circuit comprising a reciprocating rod yieldingly connected to said motor and a switch having its movable member in operative engagement with said rod.

6. In combination, a motor, a ring surrounding said motor, pivotal supports for the motor on the ring for permitting the motor to oscillate about an axis at right angles to the motor shaft, a friction pulley on the end of the motor shaft, arms extending from one side of said ring, and a driven pulley mounted between said arms and held in engagement with the side of the driving pulley opposite the motor.

In witness whereof, I have hereunto set my hand this twenty ninth day of July, 1907.

JOHN R. ANDERSON.

Witnesses:
FRANK M. WRIGHT,
FLORENCE L. SNOW.